(12) United States Patent
Bhandari et al.

(10) Patent No.: US 9,289,730 B2
(45) Date of Patent: Mar. 22, 2016

(54) HOLLOW FIBER MEMBRANES AND METHODS FOR FORMING SAME

(71) Applicant: GENERAL ELECTRIC COMPANY, Schenectady, NY (US)

(72) Inventors: Dhaval Ajit Bhandari, Clifton Park, NY (US); Patrick Joseph McCloskey, Watervliet, NY (US); Paul Edward Howson, Latham, NY (US); Kristi Jean Narang, Clarksville, NY (US); William Koros, Atlanta, GA (US)

(73) Assignee: General Electric Company, Niskayuna, NY (US)

( * ) Notice: Subject to any disclaimer, the term of this patent is extended or adjusted under 35 U.S.C. 154(b) by 166 days.

(21) Appl. No.: 13/945,459

(22) Filed: Jul. 18, 2013

(65) Prior Publication Data
US 2015/0020685 A1    Jan. 22, 2015

(51) Int. Cl.
| | | |
|---|---|---|
| *B01D 53/22* | (2006.01) | |
| *B01D 71/70* | (2006.01) | |
| *B29D 23/00* | (2006.01) | |
| *B01D 69/08* | (2006.01) | |
| *B01D 69/12* | (2006.01) | |
| *B01D 69/14* | (2006.01) | |
| *B01D 71/16* | (2006.01) | |
| *B01D 71/44* | (2006.01) | |

(Continued)

(52) U.S. Cl.
CPC .............. *B01D 71/70* (2013.01); *B01D 53/228* (2013.01); *B01D 69/088* (2013.01); *B01D 69/12* (2013.01); *B01D 69/148* (2013.01); *B01D 71/16* (2013.01); *B01D 71/44* (2013.01); *B01D 71/68* (2013.01); *B29D 23/00* (2013.01); *B01D 71/024* (2013.01); *B01D 71/027* (2013.01); *B01D 2257/102* (2013.01); *B01D 2257/504* (2013.01); *B29D 23/001* (2013.01)

(58) Field of Classification Search
CPC .... B01D 71/70; B01D 53/228; B01D 69/088; B01D 69/12; B01D 69/148; B01D 71/16; B01D 71/44; B01D 71/68; B01D 71/024; B01D 71/027; B01D 2257/102; B01D 2257/504; B29D 23/00; B29D 23/001
See application file for complete search history.

(56) References Cited

U.S. PATENT DOCUMENTS

| | | |
|---|---|---|
| 4,230,463 A | 10/1980 | Henis |
| 4,602,922 A | 7/1986 | Cabasso et al. |

(Continued)

OTHER PUBLICATIONS

"Plastic Co-Extrusion" 2 pages Nov. 5, 2015 <http://www.thomasnet.com/articles/plastics-rubber/plastic-coextrusion>.*
Koops et al., "Integrally Skinned Polysulfone Hollow Fiber Membranes for Pervaporation", Journal of Applied Polymer Science, vol. 54, pp. 385-404, 1994.
Dominic et al., "Formation of Defect-Free Polyimide Hollow Fiber Membranes for Gas Separations", Journal of Membrane Science, vol. 167, pp. 79-89, 2000.
Kapantaidakis et al., "High Flux Polyethersulfone—Polyimide Blend Hollow Fiber Membranes for Gas Separation", Journal of Membrane Science, vol. 204, pp. 153-171, 2002.

(Continued)

*Primary Examiner* — Jason M Greene
*Assistant Examiner* — Anthony Shumate
(74) *Attorney, Agent, or Firm* — Francis T. Coppa (57) ABSTRACT

The invention provides improved hollow fiber membranes having at least two layers, and methods for forming the same. The methods include co-extruding a first composition, a second composition, and a third composition to form a dual layer hollow fiber membrane. The first composition includes a glassy polymer; the second composition includes a polysiloxane; and the third composition includes a bore fluid. The dual layer hollow fiber membranes include a first layer and a second layer, the first layer being a porous layer which includes the glassy polymer of the first composition, and the second layer being a polysiloxane layer which includes the polysiloxane of the second composition.

20 Claims, 9 Drawing Sheets

(51) Int. Cl.
  *B01D 71/68* (2006.01)
  *B01D 71/02* (2006.01)

(56) References Cited

U.S. PATENT DOCUMENTS

| | | | |
|---|---|---|---|
| 5,286,280 A * | 2/1994 | Chiou | 95/45 |
| 5,888,434 A * | 3/1999 | Mahoney et al. | B01D 53/228 264/184 |
| 6,015,516 A | 1/2000 | Chung et al. | |
| 6,943,123 B2 * | 9/2005 | Ruldolph et al. | 438/778 |
| 8,337,598 B2 | 12/2012 | Yates et al. | |
| 8,734,574 B2 * | 5/2014 | Suzuki et al. | 96/4 |
| 2002/0056371 A1 | 5/2002 | Hayes | |
| 2003/0222015 A1 * | 12/2003 | Oyama et al. | 210/500.21 |
| 2006/0252054 A1 * | 11/2006 | Lin et al. | 435/6 |
| 2011/0087187 A1 * | 4/2011 | Beck | 604/500 |
| 2012/0031833 A1 | 2/2012 | Ho et al. | |
| 2014/0220344 A1 * | 8/2014 | Montoya et al. | 428/398 |
| 2014/0367326 A1 * | 12/2014 | Deng et al. | 210/500.26 |
| 2015/0053611 A1 * | 2/2015 | Wang et al. | B01D 71/64 210/500.23 |

OTHER PUBLICATIONS

Jiang et al., "An Investigation to Revitalize the Separation Performance of Hollow Fibers With a Thin Mixed Matrix Composite Skin for Gas Separation", Journal of Membrane Science, vol. 276, pp. 113-125, 2006.

Chung et al., "Mixed Matrix Membranes (MMMS) Comprising Organic Polymers With Dispersed Inorganic Fillers for Gas Separation", Progress in Polymer Science, vol. 32, Issue 4, pp. 483-507, Apr. 2007.

Sharif et al., "Improvement of CO2/CH4 Separation Characteristics of Polyethersulfone by Modifying With Polydimethylsiloxane and Nano-Silica", Journal of Polymer Research, Jun. 22, 2012.

Wallace et al., "Efficient development of effective hollow fiber membranes for gas separations from novel polymers", Journal of Membrane Science 278 (2006) 92-104.

Tang et al., Preparation and pervaporation performances of fumed-silica-filled polydimethylsiloxane—polyamide (PA) composite membranes, Journal of Applied Polymer Science, vol. 105, Issue 5, pp. 3132-3137 (2007).

* cited by examiner

HOLLOW FIBER MEMBRANES AND METHODS FOR FORMING SAME

GOVERNMENT RIGHTS STATEMENT

This invention was made with U.S. Government support under DE-FE-0007514 awarded by the Department of Energy—National Energy Technology Laboratory. The U.S. Government has certain rights in the invention.

BACKGROUND

The invention includes embodiments that relate to an improved hollow fiber membrane and to methods of forming the same.

Hollow fiber membranes are advantageously used for liquid and gas separations. For effective separations (e.g., gas separations), membrane selective layers should be nearly defect-free and should be thin (optimally, for example, having a thickness of less than 1 μm) to enable high permeances or flux. Polymeric membranes can be created by making a composite membrane with the selective polymer layer coated on to a support substrate.

Hollow fiber supports can provide the optimum geometry for high production rates and ease of module formation while providing high surface area and membrane packing density compared to flat sheets. Composite hollow fiber membranes can be manufactured by casting the selective layer on a pre-existing porous support. However, it is difficult to form ultra-thin (e.g., ~0.1 μm), defect-free selective coatings on porous supports. Typically, forming, e.g., a 100 nm defect-free film is a processing challenge. When a film is dried it has minor pin hole defects (<10 nm). For gas separation applications (which have typical size <1 nm or <10 Å), even a small crack in a 100 nm layer can make it defective. The porosity in the support layer also causes the coating to infiltrate and cause uneven coating. Typically, a 1-5 μm coating can be obtained, but below that is a challenge. Endeavoring to make very thin coating leads to spots on the support which remain uncoated (non-uniform coating), and endeavoring to cover all the spots leads to thick coatings.

Thus, a need exists for improved membranes that have, or are conducive to obtaining, a thin and/or near defect-free selective layer on the support.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

In this specification, where a document, act or item of knowledge is referred to or discussed, this reference or discussion is not an admission that the document, act or item of knowledge or any combination thereof was, at the priority date, publicly available, known to the public, part of common general knowledge, or otherwise constitutes prior art under the applicable statutory provisions; or is known to be relevant to an attempt to solve any problem with which this specification is concerned.

BRIEF DESCRIPTION

Briefly, the present invention satisfies the need for improved hollow fiber membranes and methods of making the same, that have, or are conducive to obtaining a thin and/or near defect-free selective layer on the support.

More particularly, provided is a method of forming a hollow fiber membrane comprising two layers, said method comprising co-extruding a first composition, a second composition, and a third composition to form a dual layer hollow fiber membrane, said first composition comprising a glassy polymer, said second composition comprising a polysiloxane, and said third composition comprising a bore fluid, wherein the dual layer hollow fiber membrane comprises a first layer and a second layer, the first layer being a porous layer comprising the glassy polymer of the first composition, and the second layer being a polysiloxane layer comprising the polysiloxane of the second composition.

Also provided is a hollow fiber membrane comprising a first layer and a second layer, the first layer being an inner porous layer comprising a glassy polymer, and the second layer being an outer polysiloxane layer in direct contact with the inner layer, wherein the second layer has an average thickness of less than 1 μm.

The inventive methods, comprising co-extruding a first, second, and third composition, produce improved dual layer hollow fiber membranes with desirable polysiloxane coatings, whose properties are conducive to the formation of ultra-thin defect-free selective layers, which may advantageously be formed on the improved dual layer supports. The resultant hollow fiber membranes are effective for various molecular level gas and liquid separation applications including, for example, applications involving the separation of carbon dioxide ($CO_2$) from large industrial point sources.

It has been found that reducing surface roughness or pores of a hollow fiber membrane support is important to achieving optimal membranes for gas and/or liquid separation applications. In particular, the presence and properties of a polysiloxane (e.g., PDMS) rubbery layer have been found to be important in synthesizing improved hollow fiber membranes. However, when making hollow fiber membranes having a polysiloxane coating, the coating solution can penetrate the highly porous substrates, leading to material losses and poor performance. To enable the creation of an ultra-thin selective layer and fiber membrane comprising the same, it is beneficial to fabricate improved porous supports upon which the selective layer may be advantageously coated. The present inventive methods and products are able to provide such supports—in particular, dual hollow fiber membranes which are conducive to having a selective layer incorporated thereon.

The present invention may address one or more of the problems and deficiencies of the art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

Certain embodiments of the presently-disclosed methods and improved hollow fiber membranes have several features, no single one of which is solely responsible for their desirable attributes. Without limiting the scope of these methods and fibers as defined by the claims that follow, their more prominent features will now be discussed briefly. After considering this discussion, and particularly after reading the section of this specification entitled "Detailed Description" one will understand how the features of the various embodiments disclosed herein provide a number of advantages over the current state of the art. These advantages may include, without limitation, providing methods of making hollow fiber membranes that yield improved membranes having properties (e.g., a highly porous support with engineered pore-sizes and surface porosity) which make them optimal for coating selective membrane layers on the fibers, for application in liquid and gas separations.

These and other features and advantages of this invention will become apparent from the following detailed description of the various aspects of the invention taken in conjunction with the appended claims and the accompanying drawings.

DETAILED DESCRIPTION

The present invention is generally directed to methods of forming a hollow fiber membrane, and to an improved hollow fiber membrane.

Although this invention is susceptible to embodiment in many different forms, certain embodiments of the invention are shown and described. It should be understood, however, that the present disclosure is to be considered as an exemplification of the principles of this invention and is not intended to limit the invention to the embodiments illustrated.

In one aspect, the invention relates to a method of forming a hollow fiber membrane comprising two layers. The method includes co-extruding a first composition, a second composition, and a third composition. The first composition comprises a glassy polymer. The second composition comprises a polysiloxane. The third composition comprises a bore fluid. The first, second, and third compositions are co-extruded to form a dual layer hollow fiber membrane, which includes a first layer and a second layer, the first layer being a porous layer comprising the glassy polymer of the first composition, and the second layer being a polysiloxane layer comprising the polysiloxane from the second composition.

In some embodiments, the dual layer hollow fiber membrane may be a standalone finished-product membrane ready for use in separations, whereas in other embodiments, the inventive method may comprise, or subsequent steps performed in addition to the inventive method may comprise, adding one or more additional layers to the dual layer hollow fiber membrane, thereby forming a hollow fiber membrane comprising three or more layers.

In some embodiments, the hollow fiber membrane formed according to the present invention comprises two, or three, or four layers.

While the inventive methods include co-extruding the first composition, the second composition, and the third composition, in some embodiments, the methods also include co-extruding only the first and third compositions. For example, in some embodiments, the first and third compositions are co-extruded to produce a single layer hollow fiber membrane or an intermediate thereof. In some embodiments, subsequent to co-extrusion of only the first and third compositions, extrusion of the second composition is begun, such that all three compositions are co-extruded simultaneously. It has been found that such embodiments can contribute to the elimination of difficulties in threading fiber strands through guide rolls due to, e.g. stickiness of the second composition.

The first, second, and third compositions may be co-extruded using, e.g., a triple orifice nozzle.

In some embodiments, each of the first, second, and third compositions are extruded at flow rates ($f_1$ for the first composition, $f_2$ for the second composition, and $f_3$ for the third composition) of 5 to 800 mL/h, for example, 5, 10, 15, 20, 25, 30, 35, 40, 45, 50, 55, 60, 65, 70, 75, 80, 85, 90, 95, 100, 120, 140, 160, 180, 200, 220, 240, 260, 280, 300, 320, 340, 360, 380, 400, 420, 440, 460, 480, 500, 520, 540, 560, 580, 600, 620, 640, 660, 680, 700, 720, 740, 760, 780, or 800 mL/h, including any and all ranges and subranges therein, wherein $f_1$, $f_2$, and $f_3$ may be the same or different.

In some embodiments, the first composition is extruded at a flow rate, $f_1$, of 150 to 650 mL/h, e.g., 180 to 600 mL/h, 200 to 400 mL/h, or 250 to 300 mL/h.

In some embodiments, the second composition is extruded at a flow rate, $f_2$, of 5 to 100 mL/h, e.g., 5 to 75 mL/h, or 5 to 60 mL/h. In some embodiments, the second composition is extruded at a flow rate, $f_2$, where the ratio of $f_2:f_1$ is 1:30 to 1:10, including any and all ranges and subranges therein, e.g., 1:20.

In some embodiments, the third composition is extruded at a flow rate, $f_3$, of 30 to 400 mL/h, e.g., 60 to 300 mL/h. In some embodiments, the third composition is extruded at a flow rate, $f_3$, where the ratio of $f_3:f_1$ is 1:3 to 1:2.

The temperatures of the first, second, and third compositions, and the temperature at the nozzle during extrusion, can vary considerably. In some embodiments, the first, second, and third compositions may have pump temperatures and inline temperatures of, and the nozzle temperature may be, for example, 20 to 65° C., e.g., 20, 25, 30, 35, 40, 45, 50, 55, 60, or 65° C., including any and all ranges and subranges therein (e.g., 25 to 40° C.). The pump and inline temperatures for a composition may be the same or different. The temperatures for different compositions and for the nozzle may be the same or different.

Following co-extrusion of the first, second, and third compositions, additional method steps consistent with the dry jet-wet quench solution spinning technique, which is known in the art and is described, for example, in Wallace et al., "Efficient development of effective hollow fiber membranes for gas separations from novel polymers", *Journal of Membrane Science* 278 (2006) 92-104, may be pursued.

In some embodiments, following co-extrusion through a nozzle, the extruded nascent fiber (generally, an unfinished intermediate to the finished dual layer hollow fiber membrane, which is generally stable with fully or substantially-fully cured component layers) passes into an external bath (e.g., an aqueous solution, such as, for example, a DI water bath) where its layers phase separate and/or cure and/or vitrify to form the dual layer hollow fiber membrane. In some embodiments, the temperature of the external bath is 10 to 70° C. when the intermediate to the dual layer hollow fiber membrane is contacted with the bath, e.g., 10, 15, 20, 25, 30, 35, 40, 45, 50, 55, 60, 65, or 70° C., including any and all ranges and subranges therein (e.g., 15-60° C., 35-55° C., 40-60° C., etc.). In some embodiments, the extruded nascent fiber passes through an adjustable air gap (dry jet) before entering the bath. In some embodiments, the air gap is 5-30 cm in length, for example, 5, 10, 15, 20, 25, or 30 cm, including any and all ranges and subranges therein (e.g., 10-20 cm, 10-15 cm, etc.).

Glassy polymers are well-known in the art. They typically have higher glass transition temperatures and more rigid polymer chains than rubbery polymers. Because of their properties, glassy polymers provide beneficial polymer matrices for porous support layers in the inventive hollow fiber membranes and the membranes produced by the inventive methods.

The glassy polymer of the first composition may be any glassy polymer that is conducive to achieving the desired porous layer in the hollow fiber membrane produced by the inventive method. In some embodiments, the glassy polymer may be selected from, e.g., cellulose acetate (CA), polysulfones regenerated cellulose, cellulose triacetate, polyether sulfones, polyetherimide, polyvinylidenefluoride, aromatic polyamides, aliphatic polyamides, polyimides, polyamide-imides, polyetherimides, polyetheresters, polysulfones, polybenzimidazoles, polybenzoxazoles, polyacrylonitrile, polyaromaticpolyamide imides, polyamide esters, polyesters, etc., and combinations, copolymers, and substituted polymers thereof.

In some embodiments, the second composition comprises 5 to 50 wt % of glassy polymer, for example, 5, 10, 15, 20, 25, 30, 35, 40, 45, or 50 wt %, including any and all ranges and subranges therein (e.g., 10-40%, 15-35%, etc.).

Polysiloxanes are also well-known in the art. They are polymers having repeating Si—O bonds in their backbone.

The polysiloxane of the second composition may be any polysiloxane that is conducive to achieving the desired polysiloxane layer in the hollow fiber membrane produced by the inventive method. In some embodiments, the polysiloxane may be selected from, e.g., polydimethylsiloxane (PDMS), silicone-polyimide block copolymers, polydimethyldichlorosiloxane, etc.

In some embodiments, the polysiloxane is a PDMS, and therefore the polysiloxane layer is a PDMS layer, meaning a layer of the hollow-fiber membrane that comprises PDMS.

In some embodiments, the polysiloxane may be an air, moisture, and/or heat-cured polysiloxane. For example, some embodiments of the invention use a moisture-cured or air/moisture-cured PDMS (e.g., commercially available Gelest Zipcone CE, an air/moisture curable PDMS).

In some embodiments, the polysiloxane is a cured thermoplastic silicone-polyimide block copolymer (e.g., the silicon-polyimide in commercially available Gelest Sibrid® TI, which is a fully cured thermoplastic silicone-polyimide block copolymer dissolved in N-methylpyrrolidone solvent).

In some embodiments, the second composition comprises 10 to 100 wt % of one or more polysiloxane, for example, 10, 15, 20, 25, 30, 35, 40, 45, 50, 55, 60, 65, 70, 75, 80, 85, 90, 95, or 100 wt % polysiloxane, including any and all ranges and subranges therein (e.g., 10-80%, 40-100%, 45-55%, 50-100%, etc.).

Bore fluids are also known in the art. The bore fluid of the third composition may be any bore fluid that is conducive to achieving the hollow fiber membrane produced by the inventive method.

In some embodiments, the bore fluid comprises a nonsolvent and/or a solvent, and any other desirable constituents. For example, in some embodiments, the bore fluid comprises 10-100 wt % nonsolvent, for example, 10, 15, 20, 25, 30, 35, 40, 45, 50, 55, 60, 65, 70, 75, 80, 85, 90, 95, or 100 wt % nonsolvent, including any and all ranges and subranges therein (e.g., 15-40%, 20-35%, etc.). Non-limiting examples of nonsolvents include water, methanol, ethanol, n-propanol, isopropanol, acetone, ethylene glycol, glycerol, and priopionic acid, and combinations thereof.

In some embodiments, the bore fluid comprises 10-100 wt % solvent, for example, 10, 15, 20, 25, 30, 35, 40, 45, 50, 55, 60, 65, 70, 75, 80, 85, 90, 95, or 100 wt % solvent, including any and all ranges and subranges therein (e.g., 50-90%, 70-80%, etc.). Non-limiting examples of solvents include N-methyl2-pyrrolidone, N,N-dimethylformamide, N,N-diethylformamide, N,N-dimethylacetamide, N,N-diethylacetamide, tetrahydrofuran, and dimethylsulfoxide, and combinations thereof.

In some embodiments, the bore fluid comprises both a nonsolvent and a solvent. For example, in some embodiments, the bore fluid comprises 10-90 wt % nonsolvent (e.g., water) and 10 to 90 wt % of solvent (e.g., N-methyl-pyrrolidone).

Figure 9:
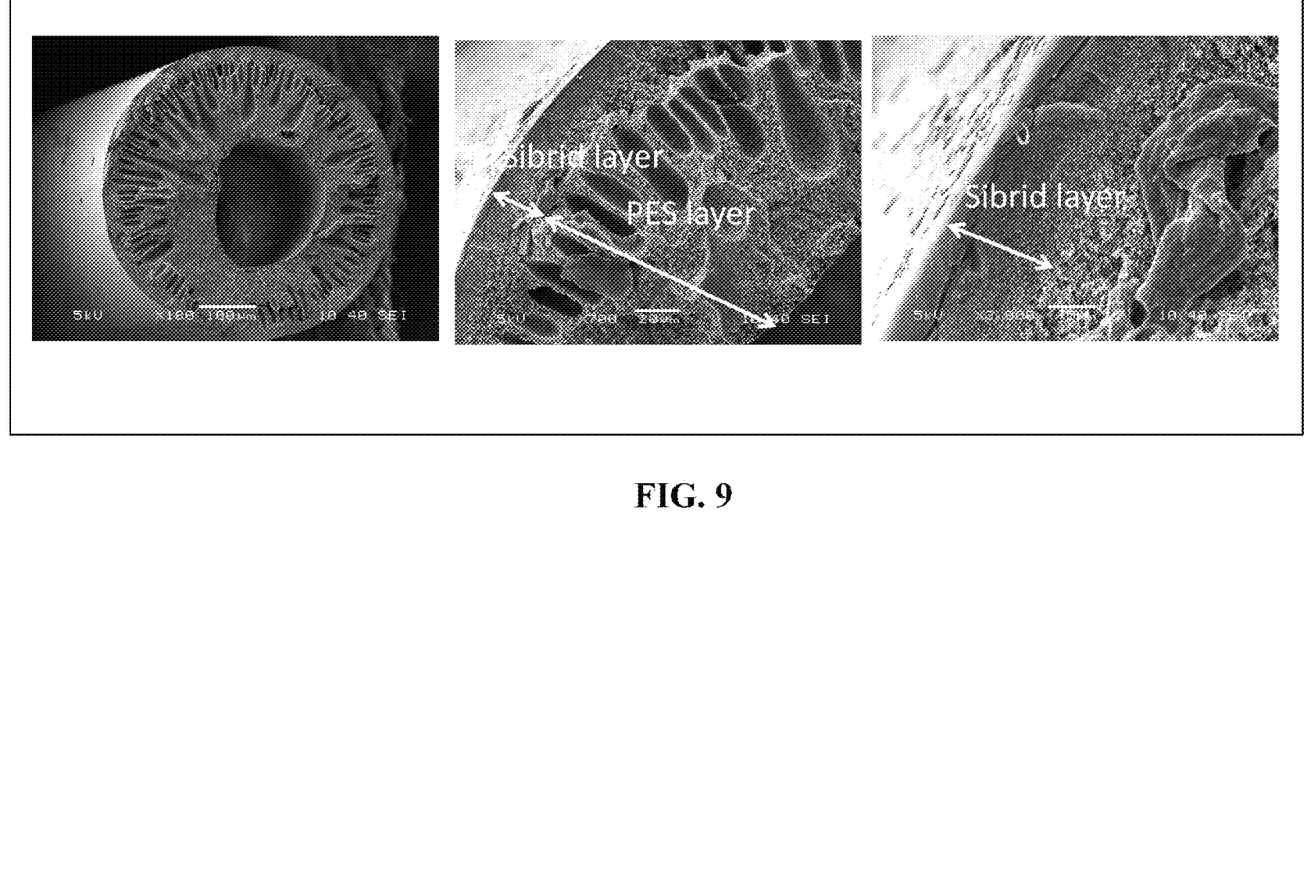
FIG. 9 depicts SEM images of a dual-layer hollow fiber membrane according to another embodiment of the invention.

In some embodiments, the porous first layer is an inner layer, and the polysiloxane second layer is an outer layer in direct contact with the inner layer, as shown, e.g., in the center image of FIG. 9 (where "PES layer" layer is the first layer and "Sibrid layer" is second layer). In some embodiments, the second layer is a continuous and/or uniform layer covering an outer surface of the inner layer.

In other embodiments, the porous first layer is an outer layer, and the polysiloxane second layer is an inner layer in direct contact with the outer layer. In some embodiments, the first composition comprises, in addition to the glassy polymer, any other desirable constituents, including, for example, one or more constituents selected from, e.g., solvents, nonsolvents, and other additives. Where one or more solvent is included in the first composition, low and/or high volatility solvents may be used. For example, in some embodiments of the invention, the first composition comprises N-methyl-2-pyrrolidone (NMP) as a low volatility solvent and/or tetrahydrofuran (THF) as a high volatility solvent. In some embodiments, water (e.g., DI water) may be included in the first composition as, e.g., a nonsolvent. While any desirable additives may be included in the first composition, in some embodiments, constituents capable of acting as pore formers are included such as, for example, polyvinyl pyrrolidone (PVP). In some embodiments, the first compositions comprises polyetheretherketones, lithium nitrate, poly(ethylene glycol) (PEG), lithium chloride (LiCl), acetic acid, phosphoric acid, and/or propionic acid.

The first layer formed by the first composition may be any desired thickness. For example, in some embodiments, the first layer has an average thickness of 10-1,000 μm, for example, 10, 50, 100, 150, 200, 250, 300, 350, 400, 450, 500, 550, 600, 650, 700, 750, 800, 850, 900, 950, or 1,000 μm, including any and all ranges and subranges there in (e.g., 50-200 μm).

In some embodiments, the second composition comprises, in addition to polysiloxane, one or more solvents. For example, in some embodiments, the second composition comprises a solvent (e.g., an organic solvent) in which the polysiloxane is soluble (meaning that the polysiloxane is soluble in the solvent before curing, e.g., prior to extrusion and curing as described above). In some embodiments, the solvent is non-reactive with the glassy polymer of the first composition. In some embodiments, the second composition comprises a hydrocarbon solvent (e.g., heptane or hexane). In some embodiments, the solvent is any non-polar solvent which dissolves uncured polysiloxane and does not dissolve the porous first layer. U.S. Pat. Nos. 4,602,922 and 4,230,463 disclose non-limiting solvents that may be suitable for using in the polysiloxane second composition.

In some embodiments, the second composition comprises 25-90 wt % solvent, for example, 25, 30, 35, 40, 45, 50, 55, 60, 65, 70, 75, 80, 85, or 90 wt %, including any and all ranges and subranges therein (e.g., 30-90%, 45-88%, 45-55%, etc.).

In some embodiments, the second composition further comprises, in addition to polysiloxane and optionally solvent, one or more different types of porous silica particles. Non-limiting examples of porous silica particles suitable for use in the second composition include, e.g., fumed silica, alumino-silicates, and combinations thereof. Inclusion of porous silica particles in the second composition can serve to improve both the permeability and structural integrity of the second layer.

The polysiloxane second layer formed by the second composition may be any desired thickness. For example, in some embodiments, the second layer has an average thickness of less than or equal to 50 μm, e.g., less than or equal to 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 μm, including any and all ranges and subranges therein (e.g., 0.1 to 0.9 μm, 0.1 to 30 μm, 5 to 25 μm, etc.).

In some embodiments, the inventive method comprises any desirable additional (e.g., subsequent) processing steps, including, for example, processing steps to add one or more layers (e.g., a selective layer) to the dual layer hollow fiber membrane produced from co-extruding the first, second, and third compositions. Accordingly, in some embodiments, the method comprises forming on the dual layer hollow fiber membrane one or more additional layers, for example, 1, or 2, or 3 additional layers. In some embodiments, at least one of the one or more additional layers comprises a material capable of liquid and/or gas separation. In some embodiments, at least one of the one or more additional layers is capable of separating compositions comprising, e.g., $H_2O$, CO, $CO_2$, $H_2S$, $H_2$, $CH_4$, $N_2$, $O_2$, $C_1$-$C_4$ hydrocarbons, VOC, etc. In some embodiments, at least one of the one or more additional layers comprises a rubbery polymer, such as a dense rubbery polymer material. In some embodiments, at least one of the one or more additional layers comprises one or more constituents selected from polyphosphazenes, poly (ether-urethane) and poly(ether-urea) block copolymers, poly(ethylene glycol) diacrylate, and polyether block amides.

In some embodiments, any of the options mentioned above for the one or more additional layers may be a constituent in the second composition, such that the resultant polysiloxane second layer itself has a particular selectivity for separating liquid and/or gaseous mixtures.

In some embodiments, the second layer has a relatively low surface roughness. In some embodiments, the second layer is highly permeable, such that it creates minimum hindrance to, e.g., gas transport through an optional one or more additional layers (e.g., a phosphazene membrane layer). In some embodiments, the second layer has a denseness such that the average pore size in the layer is less than or equal to 50 nm, e.g., less than or equal to 25, 30, 35, 40, 45, or 50 nm, including any and all ranges and subranges therein.

In another aspect, the invention relates to an improved hollow fiber membrane comprising a first layer and a second layer, the first layer being an inner porous layer comprising a glassy polymer, and the second layer being an outer polysiloxane layer in direct contact with the inner layer, wherein the second layer has an average thickness of less than 1 μm.

The improved hollow fiber membrane may be made according to the inventive method described herein.

In some embodiments, the improved hollow fiber membrane further comprises one or more additional layers as described above. In some embodiments, at least one of the one or more additional layers comprises a material capable of gas separation.

In various embodiments, the hollow fiber membranes disclosed herein are useful for separating liquid and/or gaseous mixtures. For example, in some embodiments, the fibers are useful in separating compositions comprising, e.g., $H_2O$, CO, $CO_2$, $H_2S$, $H_2$, $CH_4$, $N_2$, $O_2$, $C_1$-$C_4$ hydrocarbons, VOC, etc.

Several embodiments of the invention are described in the examples below.

EXAMPLES

Examples A-G

Hollow Fiber Membrane Fabrication

Figure 1:
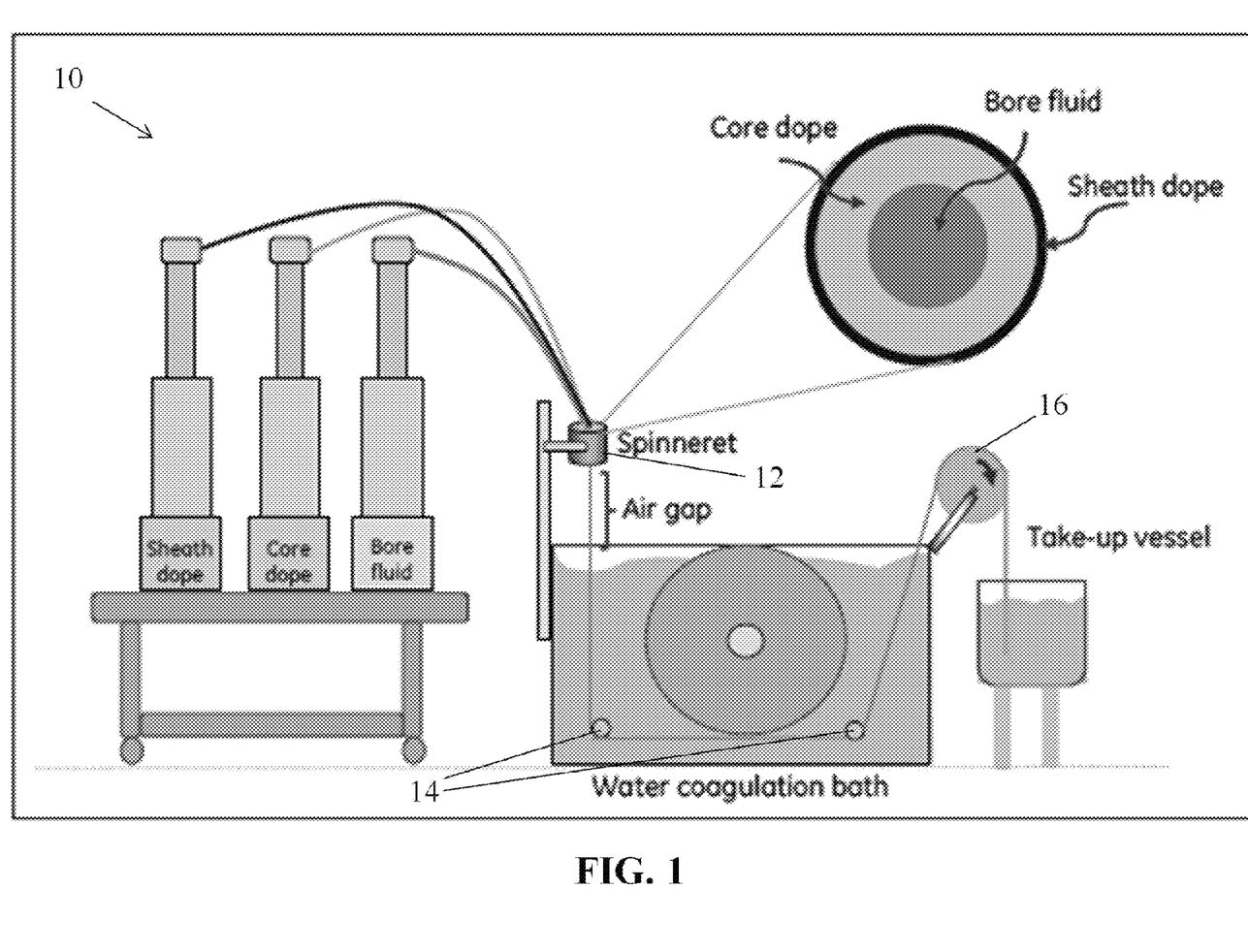
FIG. 1 is a schematic representation of the fiber spinning system used in an embodiment of the inventive fabrication process for hollow fiber membranes.

For the porous layer spin dope preparation, measured amount of solvents (THF or NMP), followed by non-solvents (DI water) and then additive (PVP) were added to a 1000 mL glass jar. The solution was then sonicated in an ultra-sonication bath until complete dissolution of the additive was observed. The desired quantity of the polymer was then added and the dope was sealed and put on a roller at room temperature (dopes w/o THF) or heated to 40 to 50° C. (dopes w/THF) with the help of an IR lamp, until complete polymer dissolution and dope uniformity was observed. The core and sheath dopes (for glassy polymer composition and polysiloxane composition, respectively) were then poured into syringe pumps for spinning and kept undisturbed for about 12 hours to ensure complete degassing of the dope solution. Hollow fiber membranes were made by the dry jet-wet quench solution spinning technique, which is described, for example, in Wallace et al. FIG. 1 is a schematic representation of the fiber spinning system 10 used in the fabrication process for the examples.

Figure 2A:
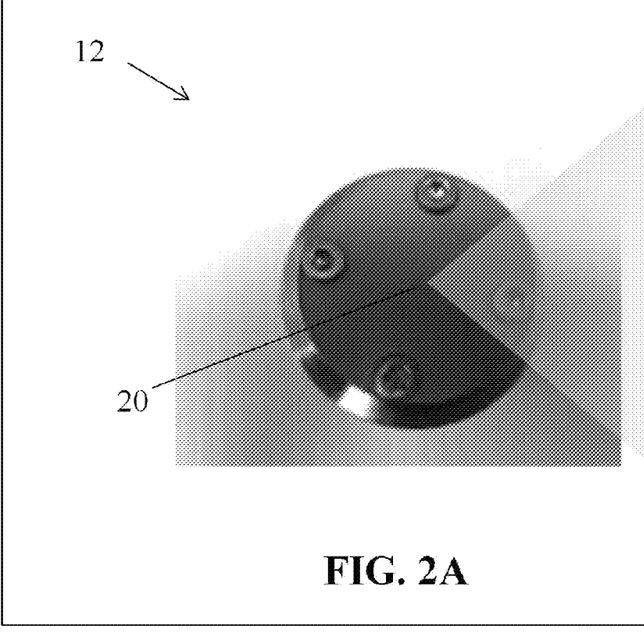
FIG. 2A shows a spinneret containing a triple orifice nozzle, which is shown in a magnified view in FIG. 2B.
Figure 2B:
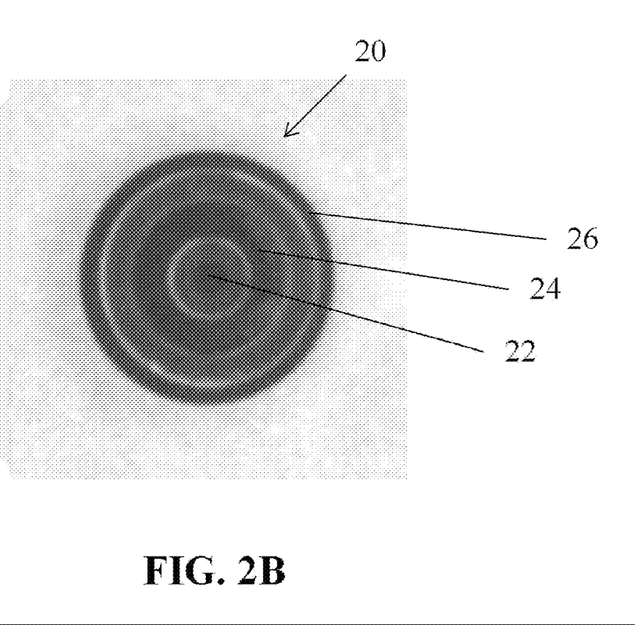

The core dope flow rate was varied between 180-600 mL/hr, while the bore layer flow rate was varied between 1:3 to 1:2 times the core flow rate and the sheath flow rate was varied between 1:30 to 1:10 times the core flow rate. All three fluids (core layer spin dope, sheath layer spin dope, and bore fluid) were extruded simultaneously using a triple orifice nozzle 20 as shown on spinneret 12 in FIG. 2A, and as shown in a magnified view in FIG. 2B, where the bore fluid was extruded from orifice 22, the core dope from orifice 24, and the sheath dope from orifice 26. Since the three fluids were extruded from nozzle 20 in this manner for Examples A-G, in all of the resultant hollow fiber membranes, the porous first layer was an inner layer, and the polysiloxane second layer was an outer layer in direct contact with the inner layer.

While initial testing (Examples A and B) endeavored to co-extrude the three fluids from the start, it was found that it was difficult to thread the fiber strand through the guide rolls due to the stickiness caused by the partially cured/uncured PDMS sheath layer. To eliminate difficulties in threading fiber strands through guide rolls due to, e.g. stickiness of polysiloxane sheath, for Examples C-G, single layer fibers (made using bore fluid and core dope) were first threaded through and collected and upon reaching a stable extrusion rate, then sheath solution flow was started, and simultaneous co-extrusion of all three fluids was acheived.

The core and sheath dopes were filtered through 40 μm mesh size in-line filters to remove any insoluble particles in the spin dope before entering the nozzle channels. Spinning temperatures (nozzle, pumps and transfer lines temperature) between 25° C. and 40° C. were studied. The extruded nascent fiber then passed through an adjustable air gap (dry jet) varied between 10-20 cm before entering the external coagulant or quench bath (wet quench) where it phase separates and vitrifies. DI water was used as an environmentally friendly and easily available quench bath (1 m deep) medium. A rotating water wheel located in the coagulation bath was used to maintain uniform mixing and bath temperature. Quench bath temperatures of 40° C. and 50° C. were studied.

The fiber then passed under two Teflon® guides 14 as shown in FIG. 1, located in the coagulation bath followed by a guide wheel 16 and then collected by a free-fall mechanism into a collection bath/takeup vessel filled with DI water. Once collected, each fiber membrane was allowed to soak in the collection bath for about 15 minutes to allow complete phase separation, curing and vitrification. Fibers spun under identical conditions (called a spin state) were then wound manually onto a rotating take-up drum with a circumference of 75 cm. The fibers from the same spin state were then removed from the take-up drum as individual strands and tied together. By manipulating various spinning parameters, several spin states were collected.

Each spin state was individually soaked in 1 m long, 1 inch diameter solvent exchange tubes to prevent curling and entanglement of the fibers. The fibers were soaked in de-ionized (DI) water for up to 3-5 days changing with fresh DI water daily. The water present in the fiber sub-structure was then solvent exchanged by immersion of spin states for 30 minutes each in two batches of fresh methanol. To remove the residual methanol the fibers were exposed to $N_2$ at room temperature for 2 days, followed by drying under $N_2$ at 80° C. for 2 days in a drying oven followed by storage for further characterization.

Table I summarizes the various fiber compositions and spinning parameters used in the examples.

TABLE I

|  | Examples | | | | | | |
| --- | --- | --- | --- | --- | --- | --- | --- |
|  | A | B | C | D | E | F | G |
| Composition | | | | | | | |
| Core layer spin dope composition (wt %) | | | | | | | |
| Cellulose Acetate (CA) | 20 | | 20 | | 20 | 20 | |
| Polyether Sulfone (PES) | | 33 | | 33 | | | 26 |
| N-Methyl-2-Pyrrolidone (NMP) | 68 | 53.1 | 68 | 53.1 | 65 | 65 | 61.5 |
| Tetrahydrofuran (THF) | | 5.9 | | 5.9 | | | |
| Polyvinyl pyrrolidone (PVP) | 3 | 5 | 3 | 5 | 5 | 5 | 10.5 |
| Water | 9 | 3 | 9 | 3 | 10 | 10 | 2 |
| Sheath layer spin dope composition (wt %) | | | | | | | |
| Gelest Zipcone CE | 100 | 100 | 100 | 100 | 50 | 50 | |
| Gelest Sibrid ® TI | | | | | | | 100 |
| Hexane | | | | | 50 | 50 | |
| Bore fluid composition (wt %) | | | | | | | |
| NMP | 80 | 75 | 70 | 75 | 70 | 70 | 75 |
| Water | 20 | 25 | 30 | 25 | 30 | 30 | 25 |
| Spinning Conditions | | | | | | | |
| Dope (Core) | | | | | | | |
| Pump temperature | 40° C. | 40° C. | 40° C. | 40° C. | 35° C. | 35° C. | 25° C. |
| In-line temperature | 40° C. | 40° C. | 40° C. | 40° C. | 35° C. | 35° C. | 25° C. |
| Flow rate (mL/h) | 300 | 600 | 300 | 600 | 180 | 180 | 300 |
| Dope (Sheath) | | | | | | | |
| Pump temperature | 25° C. | 25° C. | 25° C. | 25° C. | 25° C. | 25° C. | 25° C. |
| In-line temperature | 25° C. | 25° C. | 25° C. | 25° C. | 25° C. | 25° C. | 25° C. |
| Flow rate (mL/h) | 40 | 30 | 5 | 40 | 10 | 60 | 10 |
| Bore fluid | | | | | | | |
| Temperature | RT* | RT | RT | RT | RT | RT | RT |
| Flow rate (mL/h) | 100 | 300 | 100 | 200 | 60 | 60 | 100 |
| Nozzle temperature | 40° C. | 40° C. | 40° C. | 40° C. | 35° C. | 35° C. | 25° C. |
| Air temperature | RT | RT | RT | RT | RT | RT | RT |
| Air-gap (cm) | 18 | 10 | 10 | 10 | 10 | 10 | 15 |
| Quench bath | | | | | | | |
| Media | DI water | DI water | DI water | DI water | DI water | DI water | DI water |
| Depth | 1 m | 1 m | 1 m | 1 m | 1 m | 1 m | 1 m |
| Temperature, $T_{quench}$ | 40° C. | 40° C. | 40° C. | 40° C. | 50° C. | 50° C. | 50° C. |
| Take-up rate | Free-fall | Free-fall | Free-fall | Free-fall | Free-fall | Free-fall | Free-fall |

*RT = room temperature (~25° C.)

The cellulose acetate (CA) used in the examples had Mn≈50,000, and was obtained from Sigma-Aldrich. The polyether sulfone (PES) used in the examples had Mn≈58,000, and was obtained from Sumitomo Chemicals. The pyrrolidone (PVP) had Mn≈55,000, and was obtained from Sigma-Aldrich. Gelest Zipcone CE is a commercially-available low viscosity, solvent-free polydimethylsiloxane (PDMS) RTV. Gelest Sibrid® TI is a commercially-available fully cured thermoplastic 15 wt % silicone-polyimide block copolymer dissolved in N-methylpyrrolidone solvent.

Examples A-G

Hollow Fiber Membrane Characterization

The as-spun hollow fiber supports were evaluated by SEM-EDX analysis. The fibers were evaluated for both fiber quality (e.g., roundness, structural uniformity, concentricity) and presence and quality of a polysiloxane layer (e.g., whether polysiloxane sheath was successfully and continuously applied to the outer diameter of the fiber without infiltration into the core layer).

Figure 3:
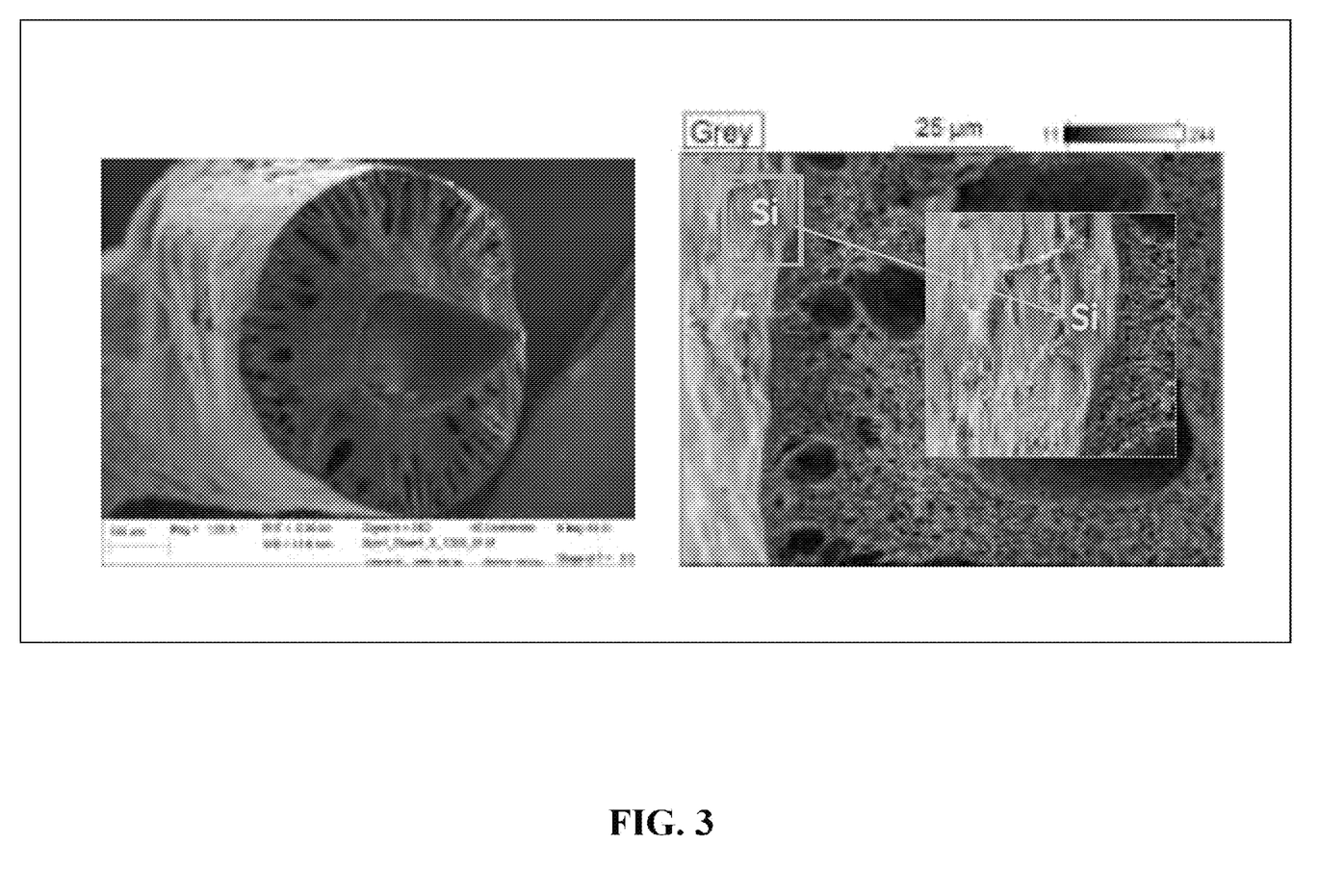
FIG. 3 depicts SEM images of a dual-layer hollow fiber membrane according to an embodiment of the invention.

FIG. 3 depicts SEM images of the resultant dual-layer hollow fiber membrane of Example A.

Figure 4:
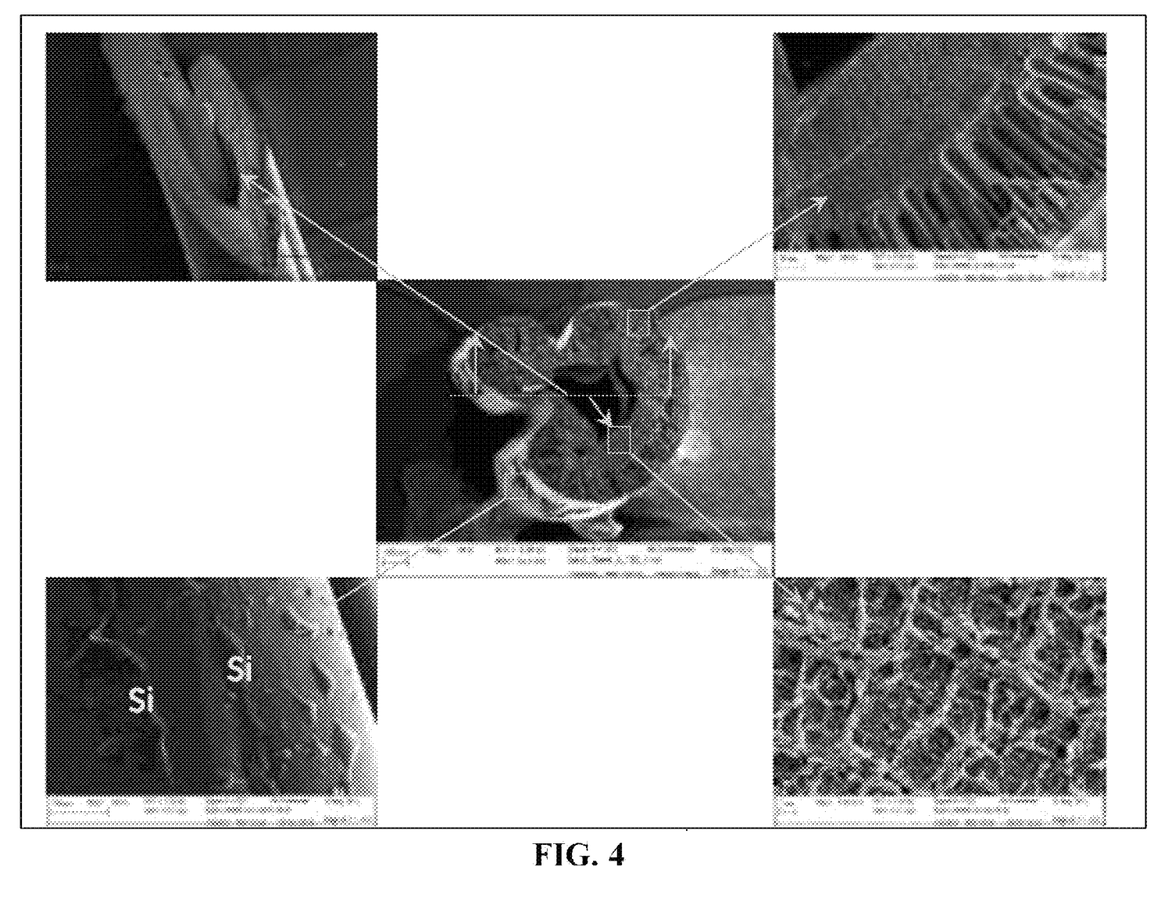
FIG. 4 depicts SEM images of a dual-layer hollow fiber membrane according to another embodiment of the invention.

FIG. 4 depicts SEM images of the resultant dual-layer hollow fiber membrane of Example B.

Examples A and B both advantageously demonstrated that a well-adhered polysiloxane (PDMS) coating with minimum infiltration could be obtained for both CA and PES hollow fiber supports. During the fabrication of Examples A and B, a low sheath solution flow rate was desired to obtain a thin polysiloxane coating on the core layer, and to provide relative ease of curing without affecting the core layer morphology. It was determined that fiber core layer morphology was distorted upon introduction of the sheath layer in these examples due to premature curing of the PDMS solution in the nozzle sheath annulus upon exposure to moisture for prolonged period during the run. For Examples C-G, appropriate care was taken to prevent premature curing of the PDMS solution by continuously running the sheath flow once started.

Figure 5:
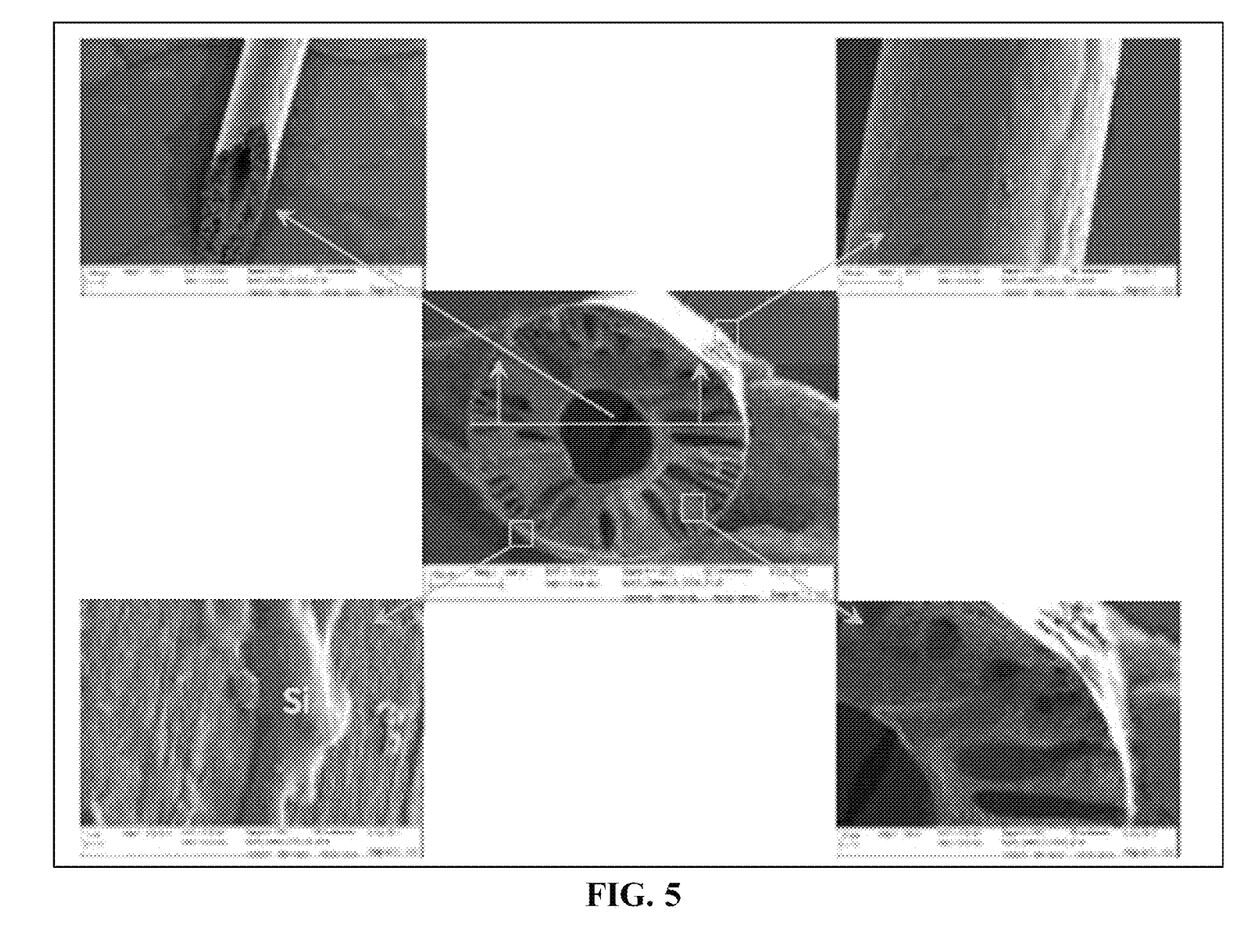
FIG. 5 depicts SEM images of a dual-layer hollow fiber membrane according to another embodiment of the invention.

FIG. 5 depicts SEM images of the resultant dual-layer hollow fiber membrane of Example C. As shown, a thin layer of PDMS was achieved on the sheath layer. Minimum infiltration into the core layer was observed.

Figure 6:
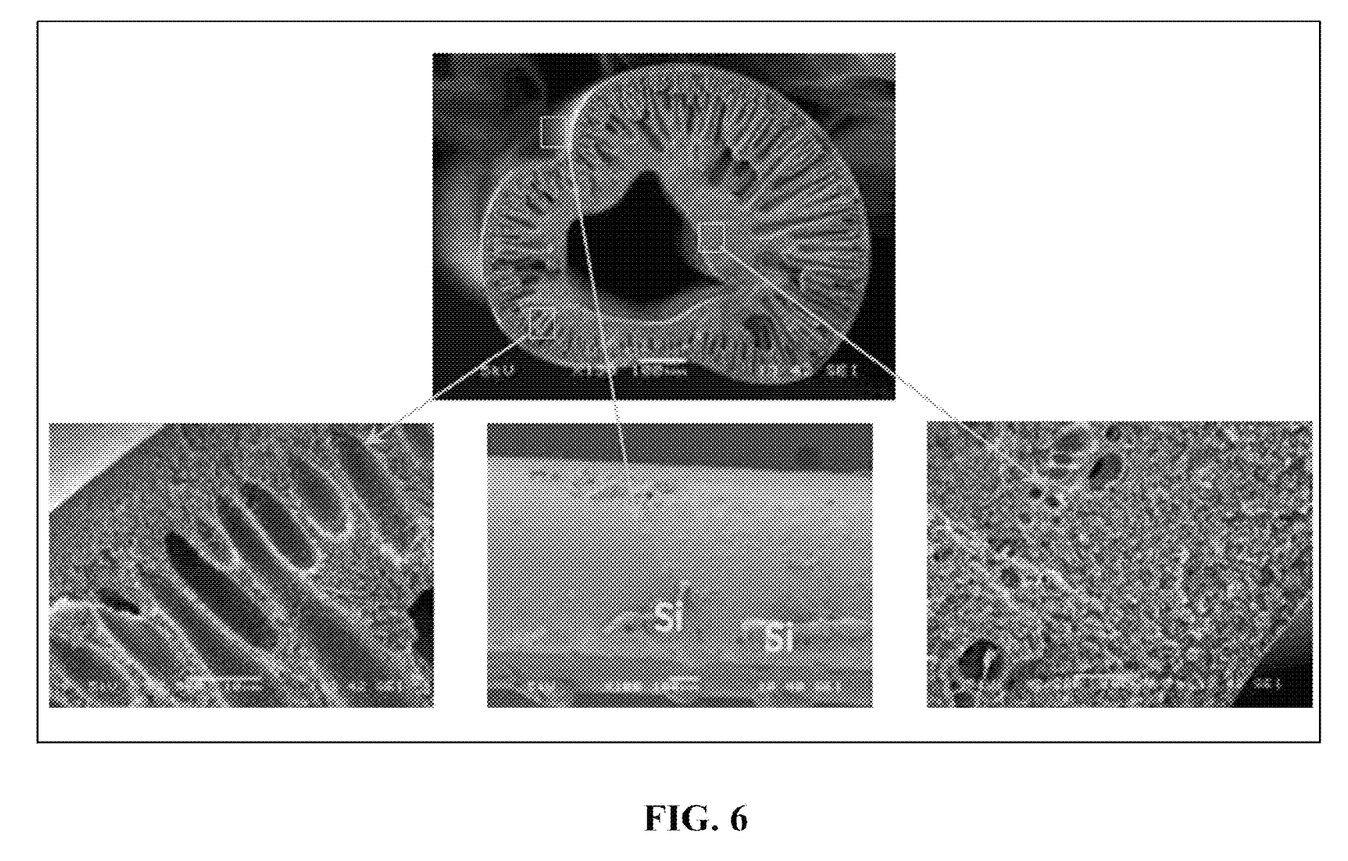
FIG. 6 depicts SEM images of a dual-layer hollow fiber membrane according to another embodiment of the invention.

FIG. 6 depicts SEM images of the resultant dual-layer hollow fiber membrane of Example D. As shown, a thin layer of PDMS was achieved on the sheath layer. Minimum infiltration into the core layer was observed.

Figure 7:
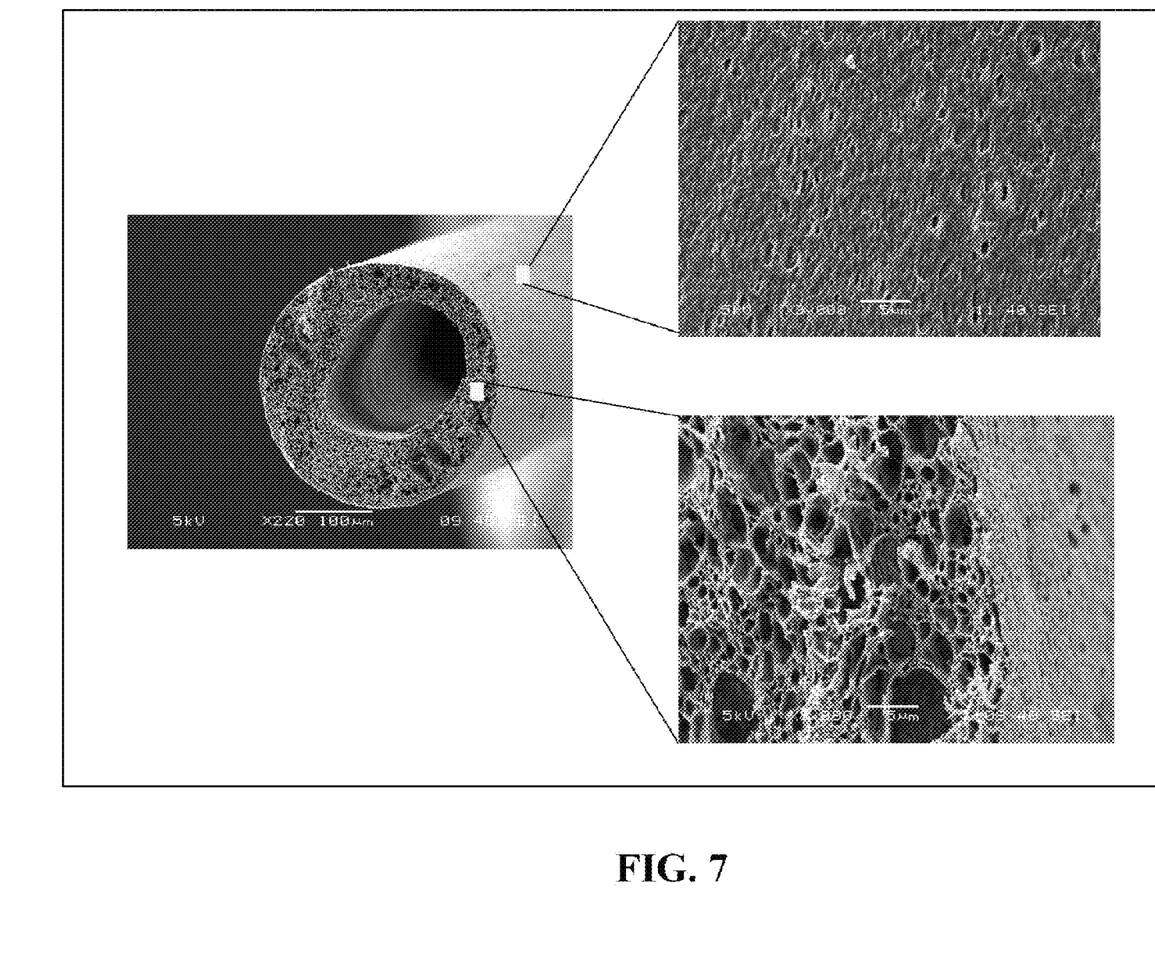
FIG. 7 depicts SEM images of a dual-layer hollow fiber membrane according to another embodiment of the invention.

FIG. 7 depicts SEM images of the resultant dual-layer hollow fiber membrane of Example E. As shown, a thin, uniform layer of PDMS was achieved on the sheath layer. Minimum infiltration into the core layer was observed.

Figure 8:
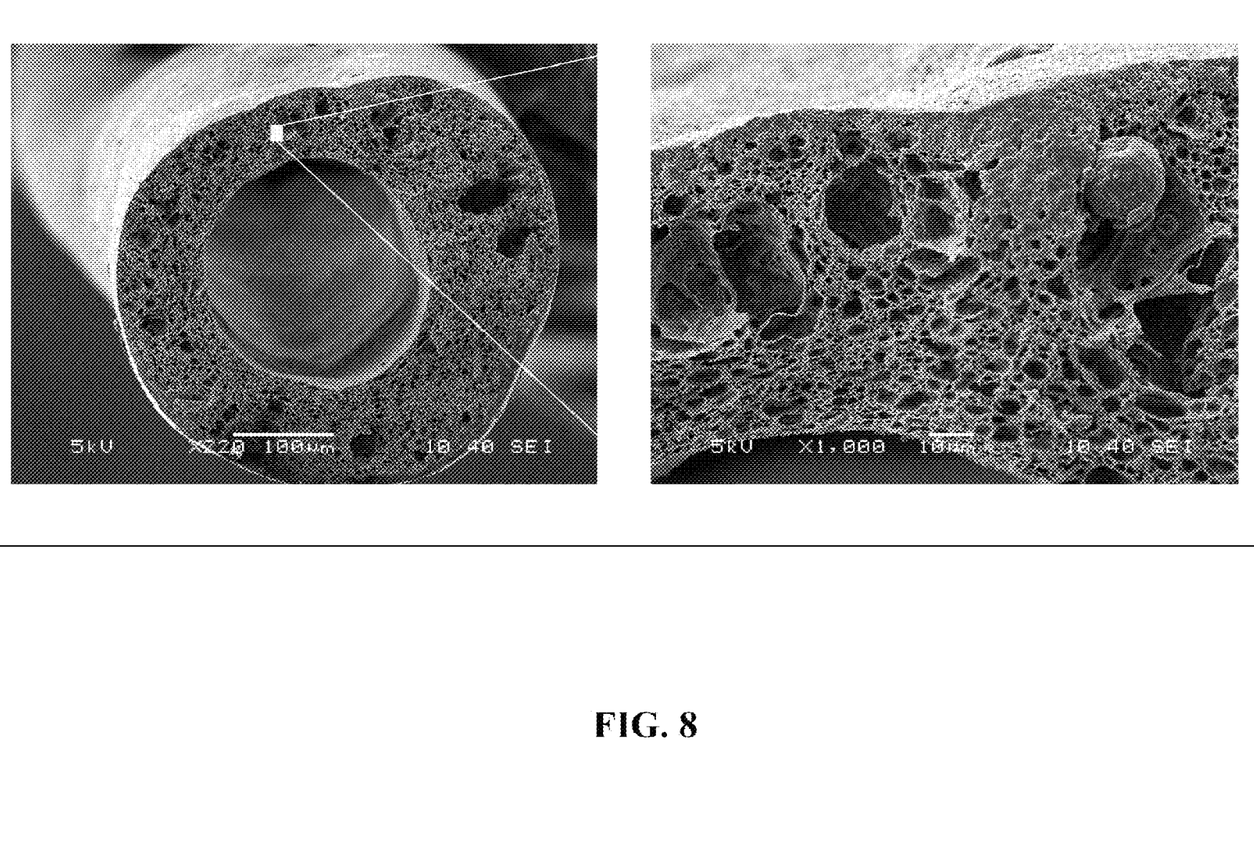
FIG. 8 depicts SEM images of a dual-layer hollow fiber membrane according to another embodiment of the invention.

FIG. 8 depicts SEM images of the resultant dual-layer hollow fiber membrane of Example F. As shown, a thin, uniform layer of PDMS was achieved on the sheath layer. Minimum infiltration into the core layer was observed.

FIG. 9 depicts SEM images of the resultant dual-layer hollow fiber membrane of Example G. As shown, a thin, uniform silicone-polyimide block co-polymer layer was achieved on the sheath layer. Minimum infiltration into the core layer was observed.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

As used herein, the terms "comprising" and "including" or grammatical variants thereof are to be taken as specifying the stated features, integers, steps or components but do not preclude the addition of one or more additional features, integers, steps, components or groups thereof. This term encompasses the terms "consisting of" and "consisting essentially of".

The phrase "consisting essentially of" or grammatical variants thereof when used herein are to be taken as specifying the stated features, integers, steps or components but do not preclude the addition of one or more additional features, integers, steps, components or groups thereof but only if the additional features, integers, steps, components or groups thereof do not materially alter the basic and novel characteristics of the claimed composition, device or method.

All publications cited in this specification are herein incorporated by reference as if each individual publication were specifically and individually indicated to be incorporated by reference herein as though fully set forth.

Subject matter incorporated by reference is not considered to be an alternative to any claim limitations, unless otherwise explicitly indicated.

Where one or more ranges are referred to throughout this specification, each range is intended to be a shorthand format for presenting information, where the range is understood to encompass each discrete point within the range as if the same were fully set forth herein.

While several aspects and embodiments of the present invention have been described and depicted herein, alternative aspects and embodiments may be affected by those skilled in the art to accomplish the same objectives. Accordingly, this disclosure and the appended claims are intended to cover all such further and alternative aspects and embodiments as fall within the true spirit and scope of the invention.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, they are by no means limiting and are merely exemplary. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, if present, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure. It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the disclosure may include only some of the described embodiments. Accordingly, the invention is not to be seen as limited by the foregoing description, but is only limited by the scope of the appended claims.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A method of forming a hollow fiber membrane comprising two layers, said method comprising co-extruding a first composition, a second composition, and a third composition to form a dual layer hollow fiber membrane,
said first composition comprising a glassy polymer,
said second composition comprising a polysiloxane, and
said third composition comprising a bore fluid,
wherein the dual layer hollow fiber membrane comprises a first layer and a second layer, the first layer being a porous layer comprising the glassy polymer of the first composition, and the second layer being a polysiloxane layer comprising the polysiloxane of the second composition.

2. The method according to claim 1, wherein the first layer is an inner layer, and the second layer is an outer layer in direct contact with the inner layer; and
the polysiloxane is polydimethylsiloxane (PDMS) or
the polysiloxane is a silicone-polyimide block copolymer.

3. The method according to claim 2, wherein the glassy polymer is selected from the group consisting of cellulose acetate, polysulfones, regenerated cellulose, cellulose triacetate, polyether sulfone, polyetherimide, polyvinylidenefluoride, aromatic polyamides, aliphatic polyamides, polyimides, polyamide-imides, polyetherimides, polyetheresters, polysulfones, polyvinylidenechloride, polybenzimidazoles, polybenzoxazoles, polyacrylonitrile, polyamide esters, and polyesters, and combinations, copolymers, and substituted polymers thereof.

4. The method according to claim 2, wherein the bore fluid comprises N-methylpyrrolidone and water.

5. The method according to claim 2, wherein the second composition further comprises porous silica particles.

6. The method according to claim 5, wherein the porous silica particles are selected from fumed silica, aluminosilicates, and combinations thereof.

7. The method according to claim 2, wherein the polysiloxane is an air, moisture, and/or heat curable PDMS and the second composition further comprises a solvent within which the PDMS is soluble.

8. The method according to claim 7, wherein the solvent is a hydrocarbon solvent.

9. The method according to claim 8, wherein the solvent is hexane or heptane.

10. The method according to claim 7, wherein the second composition comprises:
10-80 wt % PDMS; and
30-90 wt % solvent.

11. The method according to claim 10, wherein the second composition comprises:
45-55 wt % PDMS; and
45-55 wt % solvent.

12. The method according to claim 11, wherein the solvent is hexane.

13. The method according to claim 2, wherein the hollow fiber membrane is capable of separating carbon dioxide and/or nitrogen gas from a liquid or gaseous mixture.

14. The method according to claim 2, wherein, following co-extruding, an intermediate to the dual layer hollow fiber membrane is contacted with an aqueous solution.

15. The method according to claim 14, wherein the temperature of the aqueous solution is 15° C. to 60° C.

16. The method according to claim 2, further comprising forming on the dual layer hollow fiber membrane one or more additional layers.

17. The method according to claim 16, wherein at least one of the one or more additional layers or the polysiloxane layer itself comprises a material capable of gas separation.

18. The method according to claim 2, wherein, during co-extruding,
the first composition is extruded at a flow rate, $f_1$, of 180 to 600 mL/h;
the second composition is extruded at a flow rate, $f_2$, where the ratio of $f_2:f_1$ is 1:30 to 1:10; and
the third composition is extruded at a flow rate, $f_3$, where the ratio of $f_3:f_1$ is 1:3 to 1:2.

19. A method of forming a hollow fiber membrane comprising two layers, said method comprising co-extruding a first composition, a second composition, and a third composition to form a dual layer hollow fiber membrane,
said first composition comprising a glassy polymer,
said second composition comprising a polysiloxane, and
said third composition comprising a bore fluid,
wherein the dual layer hollow fiber membrane comprises a first layer and a second layer, the first layer being a porous layer comprising the glassy polymer of the first composition, and the second layer being a polysiloxane layer comprising the polysiloxane of the second composition and the second layer has an average thickness of less than 1 µm.

20. The method according to claim 19, wherein the first layer is an inner porous layer comprised of the glassy polymer, and the second layer is comprised of an outer polysiloxane layer in direct contact with the inner layer.

* * * * *